US007428934B2

(12) United States Patent
Arimura

(10) Patent No.: US 7,428,934 B2
(45) Date of Patent: Sep. 30, 2008

(54) IMPACT FASTENING TOOL

(75) Inventor: Tadashi Arimura, Kyoto (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/358,294

(22) Filed: Feb. 22, 2006

(65) Prior Publication Data

US 2006/0185869 A1 Aug. 24, 2006

(30) Foreign Application Priority Data

Feb. 23, 2005 (JP) ............................ 2005-048038

(51) Int. Cl.
*B23B 45/16* (2006.01)

(52) U.S. Cl. ........................ 173/181; 173/176; 173/104

(58) Field of Classification Search ................. 173/176, 173/181–183, 48

See application file for complete search history.

(56) References Cited

U.S. PATENT DOCUMENTS

| | | | | |
|---|---|---|---|---|
| 3,673,475 | A * | 6/1972 | Britton, Jr. | 318/122 |
| 4,316,512 | A * | 2/1982 | Kibblewhite et al. | 173/183 |
| 5,230,457 | A * | 7/1993 | Hiroi et al. | 227/2 |
| 5,285,857 | A * | 2/1994 | Shimada | 173/1 |
| 5,289,885 | A * | 3/1994 | Sakoh | 173/2 |
| 5,353,882 | A * | 10/1994 | Inoue et al. | 173/176 |
| 5,544,534 | A * | 8/1996 | Fujitaka | 73/862.23 |
| 6,371,218 | B1 * | 4/2002 | Amano et al. | 173/183 |
| 6,598,684 | B2 * | 7/2003 | Watanabe | 173/2 |
| 6,945,337 | B2 | 9/2005 | Kawai et al. | |
| 2005/0109520 | A1 | 5/2005 | Kawai et al. | |

FOREIGN PATENT DOCUMENTS

| | | |
|---|---|---|
| JP | 2000-354976 | 12/2000 |
| JP | 2001-246573 | 9/2001 |

OTHER PUBLICATIONS

English language Abstract of JP 2000-354976.
English language Abstract of JP 2001-246573.

* cited by examiner

*Primary Examiner*—Rinaldi I. Rada
*Assistant Examiner*—Lindsay Low
(74) *Attorney, Agent, or Firm*—Greenblum & Bernstein, P.L.C.

(57) ABSTRACT

In an impact fastening tool, erroneous detection of a strike by a hammer is prevented. The impact fastening tool includes a strike mechanism that transmits a driving force of a motor to an output shaft with an impact force generated by striking an anvil by the hammer, a fastening torque calculator that calculates a fastening torque equivalent to an actual fastening torque generated by the impact forces, a strike detector that detects occurrences of strikes by the hammer, a motor controller that stops the driving of the motor at a time when the fastening torque reaches a predetermined reference value, a current detector that detects current information in an interval of strikes, and a strike judger that judges whether the detection of a strike is real or unreal by using current information. The fastening torque calculator calculates the fastening torque by ignoring the strike judged real by the strike judger.

20 Claims, 11 Drawing Sheets

IMPACT FASTENING TOOL

BACKGROUND OF THE INVENTION

1. Field of the Invention

The present invention relates to an impact fastening tool such as an impact driver or an impact wrench.

2. Description of the Related Art

FIG. 10 schematically shows a block configuration of an impact driver as an example of an impact fastening tool. As can be seen from FIG. 10, the impact driver comprises a motor 1 as a driving source, and a strike mechanism 2 which generates an impact force by striking an anvil by a hammer and transmits a driving force of the motor 1 to an output shaft 3 with the impact force (not illustrated). Since the impact driver can perform a strong fastening work by its impact force and is splendid in workability because of high rotation and high torque, the impact driver is widely used in a building site or an assembly factory. Although it is not illustrated in particular, the strike mechanism 2 is comprised of a driving shaft rotatively driven by the motor 1 via a reducer (reduction gears), a hammer fitted to and rotated with the driving shaft, an anvil engaged with and rotated with the hammer, a cam mechanism which moves the hammer backward when a load equal to or larger than a predetermined reference value occurs in the anvil, and a spring for bringing the anvil to re-engage with the hammer with a strike when the anvil is disengaged from the hammer due to backward movement of the hammer. The output shaft 3 with a chuck 4 is integrally rotated with the anvil.

In FIG. 10, a numerical reference 5 designates a trigger switch. A rotation number of the motor 1, that is, a rotation number of the hammer and the output shaft 3 is controlled corresponding to a quantity of pulling the trigger switch. A numerical reference 6 designates a motor controller which uses a battery 7 as a power source and outputs a voltage set in the trigger switch 5 to the motor 1.

Japanese Laid-Open Patent Publication No. 2000-354976 proposes a method for controlling the fastening torque of such an impact driver that a fastening torque calculator for calculating a fastening torque T is provided, and the rotation of the motor 1 is stopped when the calculated torque T reaches to a predetermined reference value. The fastening torque calculator estimates the fastening torque T from a difference of kinetic energies before and after a strike of the hammer. This method is based on a relationship that an energy applied to the anvil provided at a root portion of the output shaft 3 by the strike of the hammer is substantially equal to an energy consumed in the fastening work.

Specifically, it is assumed that a relationship between a rotation angle θ of the anvil and the fastening torque T after a screw is completely fastened can be expressed in a function T=τ(θ) which is, for example, shown in FIG. 11, and it is further assumed that strikes by the hammer occur at points of rotation angles θ1, θ2, . . . θn. A value En which is an integration of the function τ in a section [θn, θn+1] designates an energy consumed in the fastening work, and is equal to an energy applied to the anvil by the strike of the hammer occurred at the point θn. Therefore, a mean value of the fastening torque T in the section can be obtained from the following equation (1) by using the integrated value En and a rotation angle Θn=(θn+1−θn) in an interval of the strikes of the hammer.

$$T=En/\Theta n \qquad (1)$$

In order to control the fastening torque T, the driving of the motor 1 should be stopped at a time when a value of the fastening torque T becomes equal to or larger than a previously set torque Ts. The integrated value En can be obtained by the following equation (2) with using a mean rotation speed Ωn of the anvil in an interval of the strikes and a known moment of inertia Ja of the anvil.

$$En=\tfrac{1}{2}\times Ja\times \Omega n^2 \qquad (2)$$

In addition, the mean rotational speed Ωn of the anvil in an interval of the strikes is obtained by dividing the rotation angle θn of the anvil in the interval of the strikes by an interval of the strikes of the hammer.

In case that the fastening torque T is obtained by using the above method including the equation (1), if a strike of the hammer, which does not really exist, is erroneously detected, the value of the calculated torque becomes inaccurate, so that the motor 1 cannot be stopped with the most suitable number of strikes of the hammer, consequently. Thus, since occurrence of the strike by the hammer must be detected precisely, a strike detector having high reliability is essential, thereby causing cost increase.

Therefore, Japanese Laid-Open Patent Publication No. 2001-246573 proposes a method for judging real or unreal of the occurrence of the strike of the hammer on the basis of the rotation speed of the output shaft 3 and rotation angle in an the interval of the strikes. However, when the impact fastening tool is actually used, various load fluctuations may occur. Thus, superficial phenomena such as the rotation of the output shaft 3 or the interval of the strikes may cause the reduction of reliability of the judgment result.

SUMMARY OF THE INVENTION

The present invention is conceived in view of the above mentioned problems, and an object of the present invention is to provide an impact fastening tool that can calculate a fastening torque precisely with preventing erroneous detection of a strike of a hammer, surely, and thereby, that can stop driving of a motor with the most suitable number of the strike of the hammer.

An impact fastening tool in accordance with an aspect of the present invention comprises a motor for generating a driving force, an output shaft for fastening an object to be fastened, a strike mechanism including a hammer and an anvil integrally rotated with the output shaft, generating impact force by striking the anvil by the hammer and transmitting the driving force generated by the motor to the output shaft with the impact force, a strike detector for detecting occurrence of strikes of the anvil by the hammer; a current detector for detecting current information in an interval of the strikes, a strike judger for judging whether detection of the strike by the strike detector is real or unreal with using current information, a fastening torque calculator for calculating a fastening torque equivalent to a fastening torque generated by the impact forces with ignoring the strike judged unreal by the strike judger, and a motor controller for stopping driving of the motor at a time when the calculated fastening torque reaches to a predetermined reference value.

In the impact fastening tool configured as above, the detection of strike by the strike detector is judged real or unreal by the strike judger on the basis of essential phenomenon such as current information flowing in the motor instead of superficial phenomenon such as a rotation of the output shaft or an interval of the strikes. Thus, it is possible to prevent the erroneous detection of the strike against multiple variation of the load of the motor, surely, so that the fastening torque can be calculated precisely. As a result, the driving of the motor can be stopped when the number of the strikes reaches to the most suitable number corresponding to the most suitable number of the strikes.

BRIEF DESCRIPTION OF THE DRAWINGS

FIG. 2A shows pulse width of each pulse, FIG. 2B shows pulse width of each width after filtering process, and FIG. 2C shows variation of the pulse width;

FIG. 7A shows a comparison of wood screw with metal screw, and FIG. 7B shows a work operation for fastening a metal screw into a metal plate;

DETAILED DESCRIPTION OF THE EMBODIMENT

Figure 10:
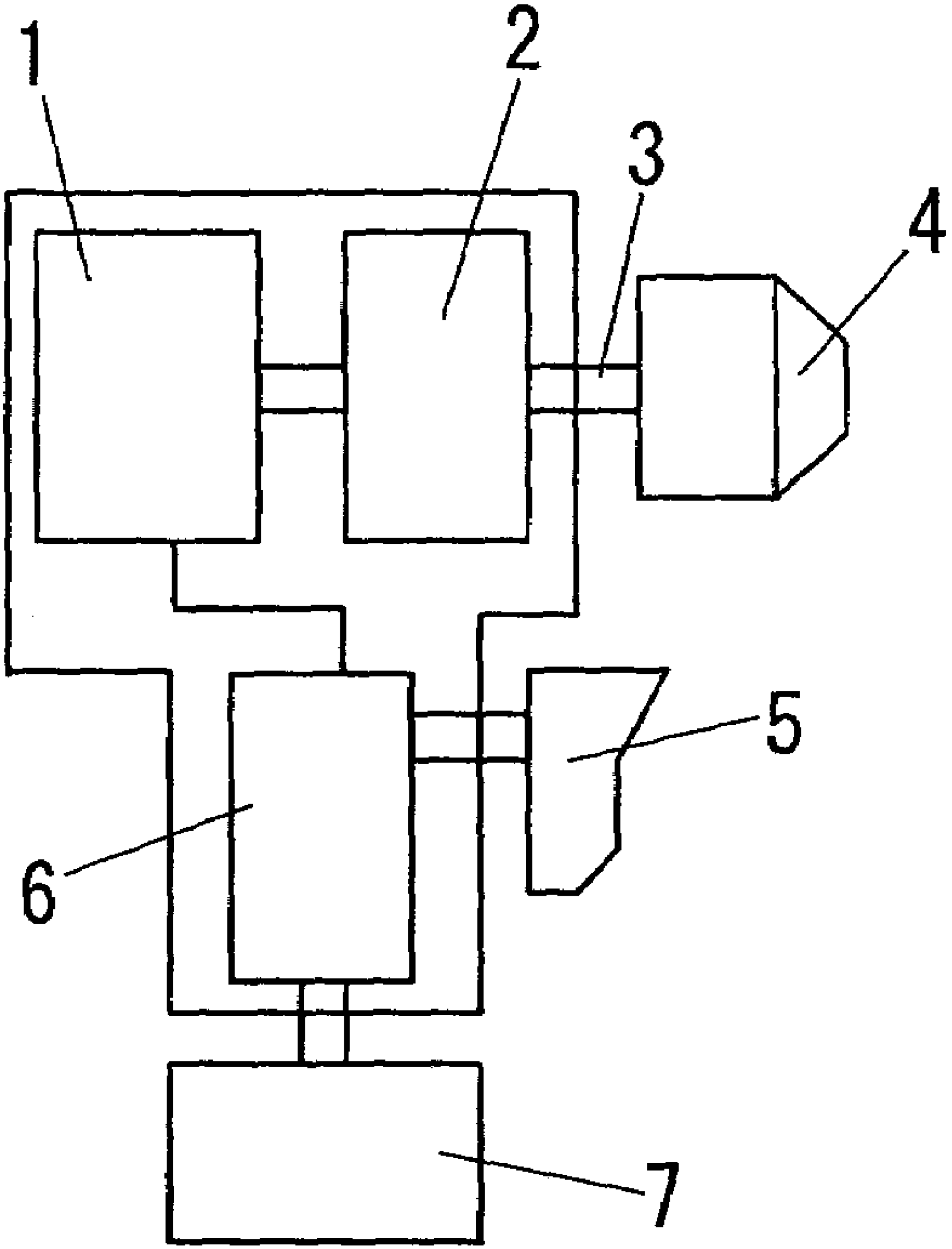
FIG. 10 is a block diagram schematically showing a basic configuration of a conventional impact fastening tool.
Figure 11:
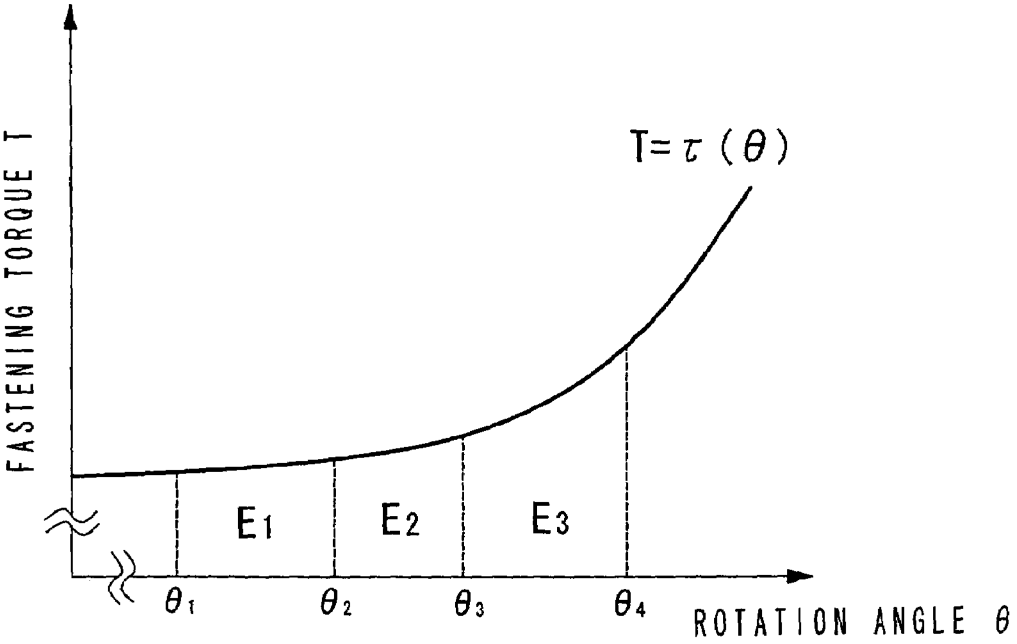
FIG. 11 is a graph showing a conventional method for calculating fastening torque in the conventional impact fastening tool.

An impact fastening tool in accordance with an embodiment of the present invention is described with reference to the figures. In the following description, an impact driver is described as an example of the impact fastening tool, and elements substantially the same as those shown in FIGS. 10 and 11 are designated by the same numerical references so that the detailed explanation of them are omitted.

Figure 1:
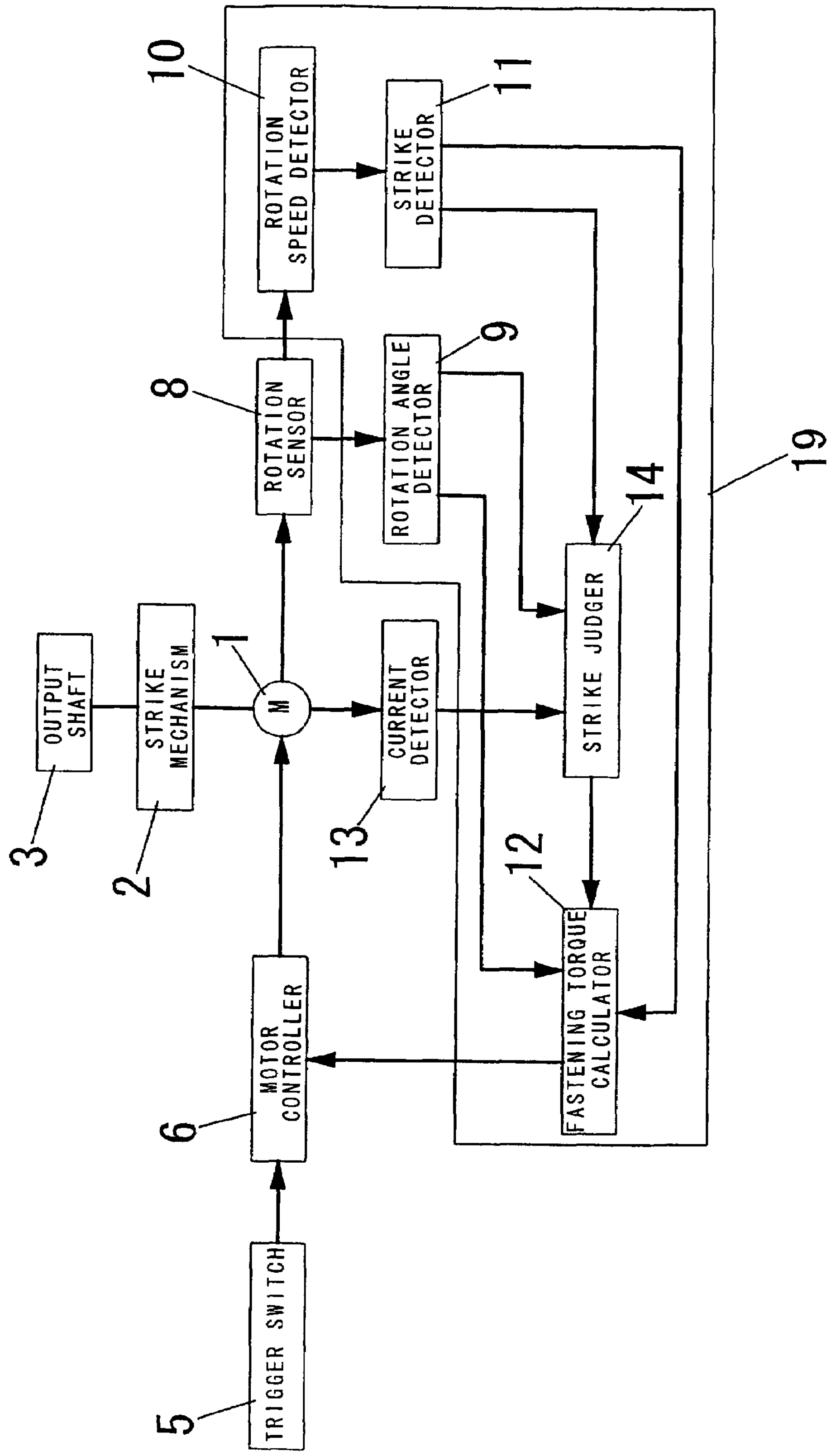
FIG. 1 is a block diagram showing a basic configuration of an impact fastening tool in accordance with an example of the present invention.

FIG. 1 is a block diagram showing a configuration of an impact fastening tool in accordance with the embodiment of the present invention. The impact fastening tool comprises a rotation sensor 8 configured by such as a frequency generator for outputting a predetermined number, for example, designated by a reference symbol "A" by one rotation of a shaft of a motor 1. A rotation angle detector 9 calculates a rotation angle $\Delta r$ of the motor 1 by counting a pulse number outputted from the rotation sensor 8, and further calculates an anvil rotation angle $\theta$ based on the rotation angle $\Delta r$ of the motor 1. Hereupon, when a reduction ratio of a reducer of a strike mechanism 2 is designated by a reference symbol "K", an output shaft 3 rotates one turn, that is, the anvil rotation angle $\theta=2\pi$, when a number $K\times A$ of pulses are counted before striking by a hammer.

Figure 2A:
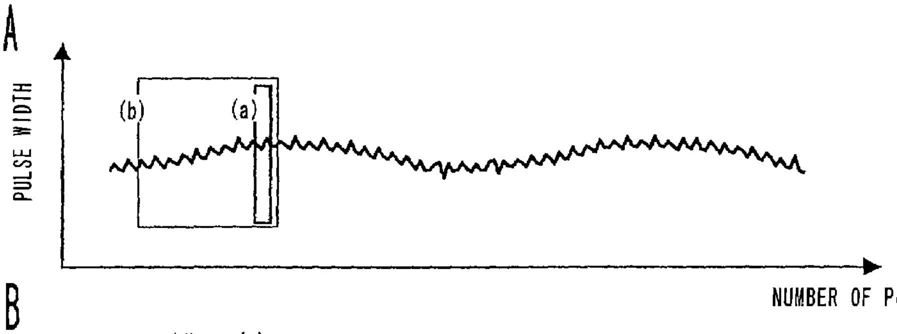
FIGS. 2A to 2C are graphs respectively showing a method for detecting a strike in the above impact fastening tool, and especially.
Figure 2B:
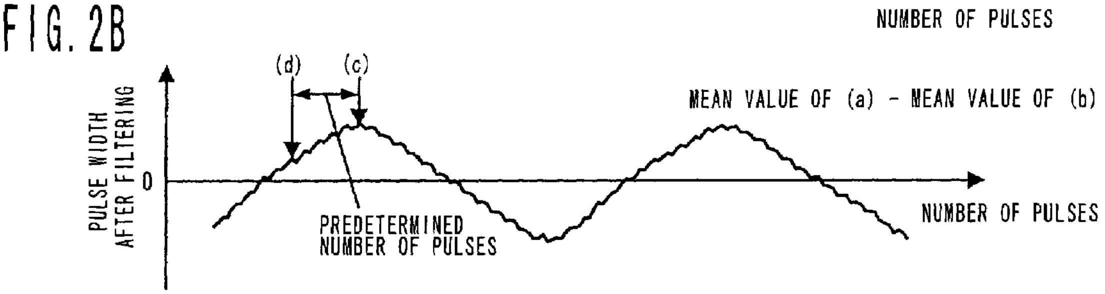
Figure 2C:
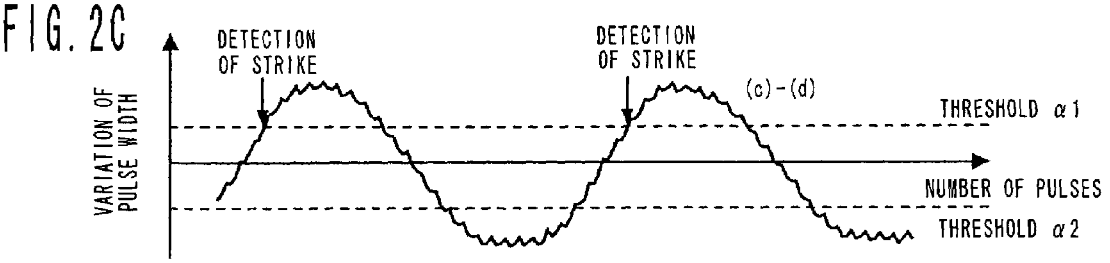
Figure 3:
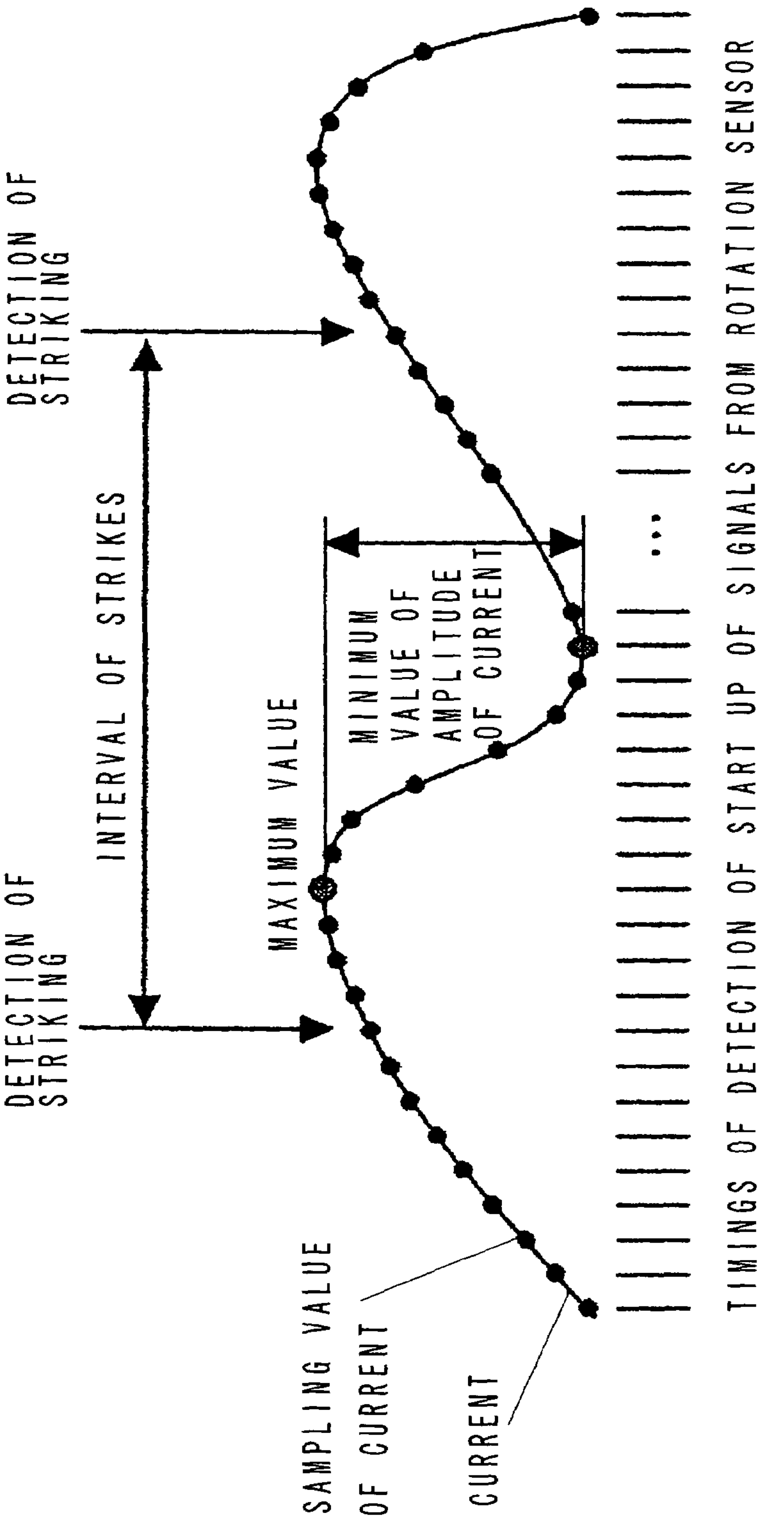
FIG. 3 is an explanatory drawing showing a relationship between sampling values of current and detection of strike in the above impact fastening tool.

A rotational speed detector 10 detects rotational speed $\omega$ of the shaft of the motor 1 (hereinafter, abbreviated as the rotation speed $\omega$ of the motor 1) by measuring a pulse width of pulses outputted from the rotation sensor 8. A strike detector 11 detects strikes of the hammer in the strike mechanism 2 based on variation of the pulse width of the pulses measured by the rotation speed detector 10. FIGS. 2A to 2C show an example of a method for detecting occurrence of a strike by the hammer utilizing a method called high-pass filter method in which a moving average of the variation of the pulse width for a long term is subtracted from a moving average of the variation of the pulse width for a short term.

FIG. 2A shows pulse width of each pulse measured by the rotation speed detector 10. In FIG. 2A, abscissa designates a number of pulses outputted from the rotation sensor 8, and ordinate designates the pulse width of each pulse. The measured pulse widths are sequentially memorized in a memory. An area enclosed by a small box designated by a reference symbol "a" corresponds to the above short term, and includes a predetermined number "P" of pulses. Another area enclosed by a large box designated by a reference symbol "b" corresponds to the above long term, and includes a predetermined number "Q" (Q>P) of pulses. The moving average of the variation of the pulse width for the short term is calculated by averaging the values of the pulse widths included in the area enclosed by the small box "a". Similarly, the moving average of the variation of the pulse width for the long term is calculated by averaging the values of the pulse widths included in the area enclosed by the large box "b". Then, the calculated moving average of the variation of the pulse width for the long term is subtracted from the moving average of the variation of the pulse width for the short term, so that a pulse width with respect to the area enclosed by the small box "a" to which filtering process is performed can be obtained. Calculated result of such subtraction is further memorized in the memory. By shifting the small box "a" one by one in abscissa, pulse width of each pulse after filtering process can be obtained, as shown in FIG. 2B.

Subsequently, a value of the pulse width after filtering process of a pulse, which is former by a predetermined number of pulses from the present pulse, is subtracted from a value of the pulse width after filtering process of the present pulse. In FIG. 2B, it is assumed that a reference symbol "c" designates the value of the pulse width after filtering process of the present pulse, and a reference symbol "d" designates the value of the pulse width after filtering process of the pulse former by the predetermined number of pulses from the present pulse. The value of the pulse width "d" is subtracted from the value of the pulse width "c". Such subtraction is performed with respect to each value of the pulse width after filtering process. FIG. 2C shows the result of the subtraction of the pulse widths, that is, variation of the pulse width.

When the strike of the hammer occurs, the variation of the pulse width varies like sine curve corresponding to increase of the number of the detected pulses. Thus, when the variation of the pulse width becomes larger than a predetermined threshold $\alpha 1$, it is judged that the strike of the hammer occurs. In order to increase the accuracy of the detection of the occurrence of the strike, it may be established that the detection of the occurrence of the strike is not performed again unless the variation of the pulse width becomes smaller than a predetermined threshold $\alpha 2$ ($\alpha 2<\alpha 1$) after being larger than the threshold $\alpha 1$. By such establishment, it is possible to decrease a frequency that variation of the pulse width due to a cause except the strike is erroneously judged as a strike.

The strike detector 11 is not limited to the configuration that the occurrence of the strike of the hammer is detected by measuring the variation of the pulse width, and it may be a configuration that the occurrence of the strike of the hammer is detected with using another means such as a microphone or a shock sensor.

A fastening torque calculator 12 calculates a mean value of fastening torque T generated by strikes based on the above-mentioned equations (1) and (2) by using the results of detection by the rotation angle detector 9 and the strike detector 11. Hereupon, a rotation angle Θn of the anvil, that is, the output shaft 3 in an interval of the strikes of the hammer can be obtained from the following equation (3) by using a reduction ratio "K", a rotation angle ΔR of the shaft of the motor 1 in the interval of the strikes by the hammer, and an idling angle RI of the hammer.

$$\theta n=(\Delta R/K)-RI \qquad (3)$$

The idling angle RI of the hammer is calculated by dividing 2 π by a number C of the strikes of the hammer per one rotation of the output shaft 3. When the hammer is configured to strike twice per one rotation of the output shaft 3, the idling angle RI=π, and when the hammer is configured to strike thrice per one rotation of the output shaft 3, the idling angle RI=2π/3.

When a brushless motor is used as the motor 1, a sensor of the brushless motor for detecting a position of a rotor may be used as the rotation sensor 8 without providing an independent sensor, and the rotation angle Δr and a rotation speed ω of the motor 1 may be calculated on the basis of the detection result of the sensor. In this case, a number of detection of the positions of the rotor per one rotation of the shaft of the motor 1 corresponds to a number of pulses outputted from the rotation sensor 8, and a detection width of the positions of the rotor corresponds to the pulse width of the pulse outputted from the rotation sensor 8.

A current detector 13 detects a value of current flowing in the motor 1 whenever rising up of a pulse outputted from the rotation sensor 8 is detected, and memorizes the value of current into the memory. A strike judger 14 judges whether the present strike by the hammer is normally performed or not with using current information which is detected by the current detector 13 and memorized into the memory from the detection of the previous strike to the detection of the present strike at every time when the strike is detected by the strike detector 11. As for the current information, either of a mean value of current, a maximum value of current and a value of amplitude of current may be used. The strike judger 14 judges that the detection of the present strike is normal or real when the value of such current information is larger than a predetermined threshold, and judges that the detection of the present strike is error or unreal when the value of such current information is equal to or smaller than the threshold. The value of amplitude of current is a difference between the maximum value and a minimum value of the current in an interval of the strikes.

In addition, the rotation angle detector 9, the rotation speed detector 10, the strike detector 11, the fastening torque calculator 12 and the strike judger 14 constitute a control circuit 19 for automatically stopping the driving of the motor 1 when the most suitable number of strikes occurs.

Figure 4:
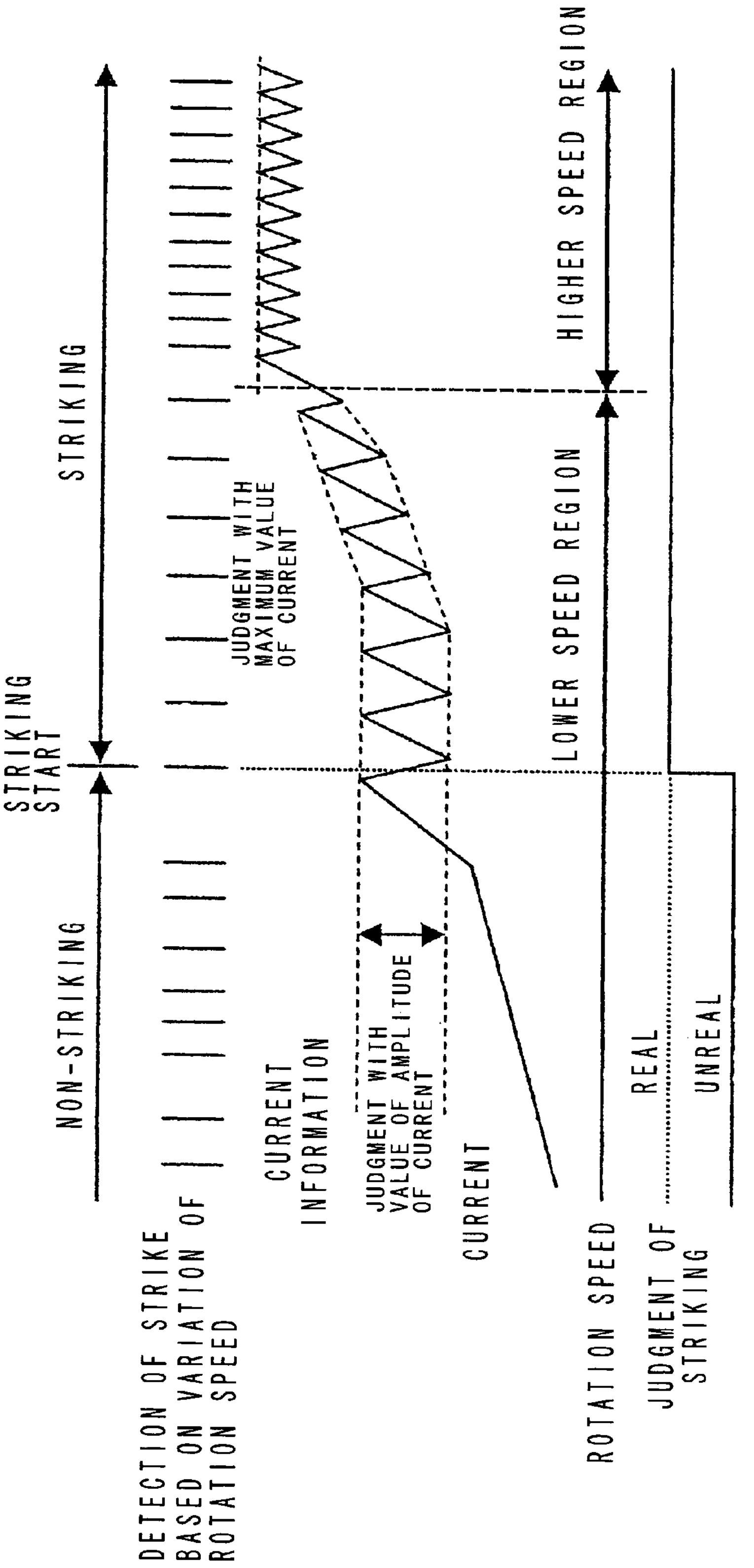
FIG. 4 is an explanatory drawing showing a method for judging real or unreal of occurrence of the strike which is suitable for wood screw in the above impact fastening tool.
Figure 5:
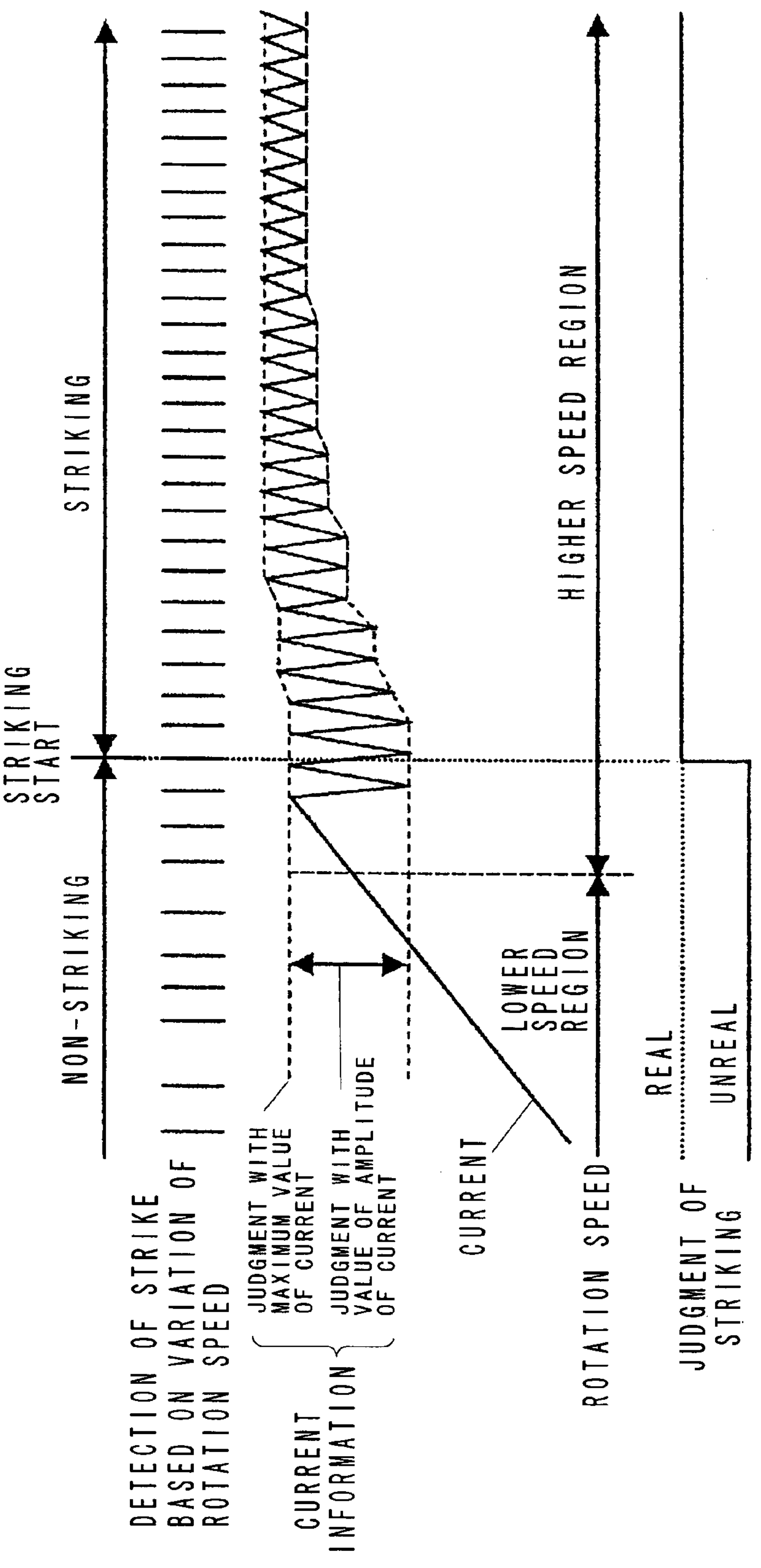
FIG. 5 is an explanatory drawing showing another method for judging real or unreal of occurrence of the strike which is suitable for wood screw in the above impact fastening tool.

FIGS. 4 and 5 each shows an example of the method for judging whether the strike is normally performed or not (real or unreal) with using the maximum value and the value of amplitude of the current as the current information. As can be seen from the figures, the faster the rotation speed of the motor 1 becomes, the larger the maximum value of the current in the interval of the strikes becomes, but the smaller the value of the amplitude of the current in the interval of the strikes becomes. The reason why the maximum value of the current behaves in this way is that the voltage applied to the motor 1 must be increased so as to rotate the motor 1 at a high speed. The reason why the value of the amplitude of the current behaves in this way is that the higher the rotation speed of the motor 1 becomes, the larger the inertial force of the hammer becomes, and thereby the variation of the speed due to the occurrence of the strike becomes smaller. These methods are suitable, especially, for a wood screw used in the wood work.

In the example shown in FIG. 4, in a lower speed region where the rotation speed ω of the motor 1 detected by the rotation speed detector 10 is equal to or smaller than a predetermined threshold, the judgment of strike real or unreal is performed with using the value of the amplitude of the current. On the other hand, in a higher speed region where the rotation speed ω of the motor 1 is larger than the predetermined threshold, the judgment of strike real or unreal is performed with using the maximum value of the current. In the lower speed region, the strike judger 14 compares the value of the amplitude of the current with a predetermined threshold, and judges that the detection of the strike is erroneous or unreal when the value of the amplitude of the current is equal to or smaller than the threshold. In the higher speed region, the strike judger 14 compares the maximum value of the current with a predetermined threshold, and judges that the detection of the strike is erroneous or unreal when the maximum value of the current is equal to or smaller than the threshold. Since the current information used in the judgment of real or unreal of the strike is automatically selected corresponding to the rotation speed ω of the motor 1, it is possible to judge the strike by the hammer real or unreal accurately in a broad region from low speed to high speed.

In the example shown in FIG. 5, in the lower region, the value of the amplitude of the current is used for performing the judgment of strike real or unreal. In the higher region, both of the value of the amplitude of the current and the maximum value of the current are used for performing the judgment of strike real or unreal, and it is judged erroneous or unreal when at least one of (preferably both of) the value of the amplitude of the current and the maximum value of the current is equal to or smaller than a threshold.

In addition, the mean value of the current may be used as the current information so that the mean value of the current is compared with a predetermined threshold, and the detection of strike may be judged erroneous or unreal when the mean value of the current is equal or smaller than the threshold. In this case, it is preferable that the strike judger 14 is configured automatically to select at least one of the maximum value of the current, the value of the amplitude of the current and the mean value of the current corresponding to the rotation speed ω of the motor 1.

Figure 6:
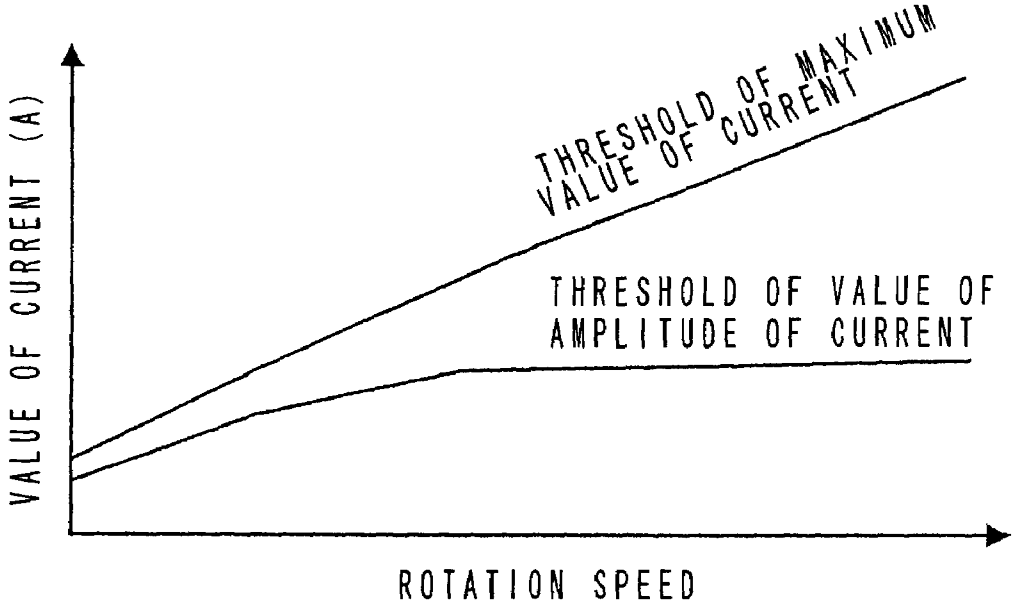
FIG. 6 is a graph showing a relationship between current value information and rotational speed in the above impact fastening tool.

Since the current information such as the mean value of the current, the maximum value of the current or the value of the amplitude of the current in the interval of the strikes is varied corresponding to the rotation speed of the motor 1, the threshold which is compared with the current information is automatically changed depending on the detection result of the rotation speed detector, as shown in FIG. 6.

The fastening torque calculator 12 calculates a fastening torque T with ignoring or disabling the strike which is judged erroneous or unreal by the strike judger 14. Then, the value of the calculated fastening torque T reaches to a predetermined reference value, the motor controller 6 stops the driving of the motor 1.

Figure 7A:
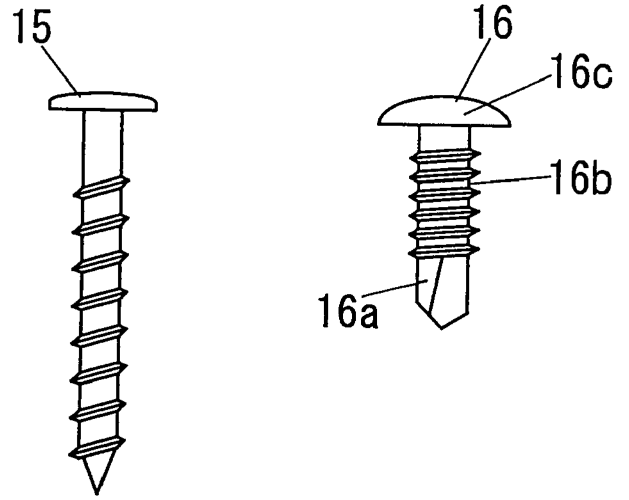
FIGS. 7A and 7B are explanatory drawings showing metal fastening work operation in the above impact fastening tool, and especially.

Since the impact fastening tool in this embodiment comprises the strike judger 14 which judges whether the strike of the hammer is normally performed or not, it is possible to ensure sufficient accuracy for detecting the strikes, especially, in woodwork or in dressed lumber fastening work. However, when a metal fastening torque is performed, there may be a case that sufficient accuracy for strike detection cannot be ensured. FIG. 7A shows an example of a wood screw 15 and a tapping screw 16 as an example of a metal screw. In comparison with these screws 15 and 16, it is found that the tapping screw 16 has a pair of blades 16*a* which is symmetrically formed at an interval 180 degrees at a front end thereof. These blades 16*a* are generally used for drilling through holes on metal plates 17 and 18 which are made of, for example, iron and are the objects to be fastened by the tapping screw 16, and threads 16*b* formed near to a head 16*c* of the tapping screw 16 cut female threads (tapping) around the through holes on the metal plates.

Figure 7B:
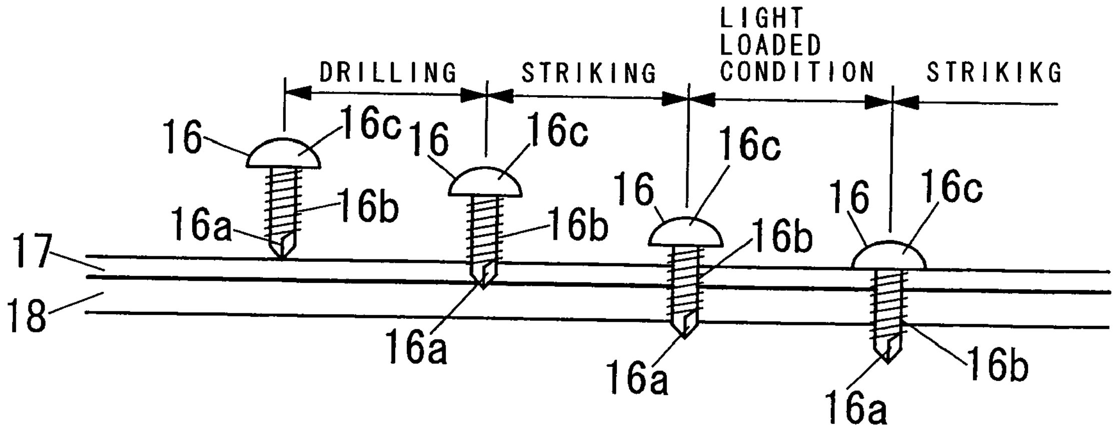

FIG. 7B shows steps in a fastening operation of the metal plates 17 and 18 by the tapping screw 16 sequentially from left hand to right hand. When the drilling by the blades 16*a* proceeds in some extent, the threads 16*b* start to cut the female threads, so that a load of the output shaft 3 suddenly increases. Then, the hammer starts to strike the anvil on the output shaft 3 so as to drill the through holes by the blades 61*a* and to form the female threads around the through holes on the metal plates 17 and 18 by the threads 16*b*, simultaneously. When the blades 16*a* penetrate the metal plates 17 and 18, the load on the output shaft 3 is lightened because only the cutting the thread becomes the load. Thus, the hammer may not strike the anvil or may strike the anvil with a small impact. Furthermore, when the head 16*c* of the tapping screw 16 contacts with the metal plate 17, the load on the output shaft 3 suddenly increases again, and the hammer starts to strike the anvil. After striking the anvil several times by the hammer, the tapping screw 16 becomes the most suitable fastening condition for fastening the metal plates 17 and 18.

Figure 8:
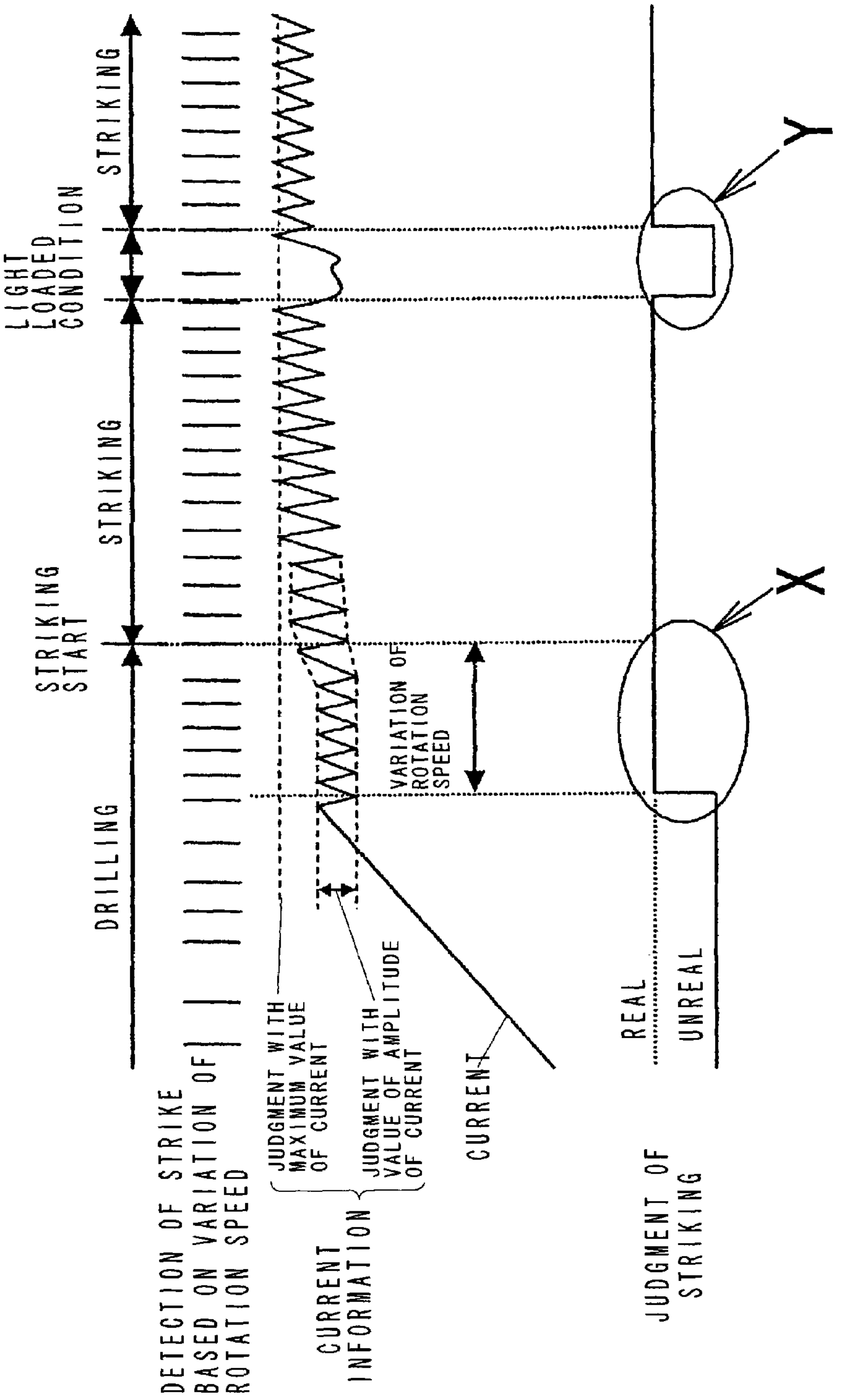
FIG. 8 is an explanatory drawing showing a fastening process of a metal screw such as a tapping screw which is judged by the method suitable for wood screw shown in FIG. 4 or 5.

FIG. 8 shows an example of the judgment of strike real or unreal in the above-mentioned fastening process of the tapping screw 16 by the method suitable for wood screw shown in FIG. 4 or 5. In an ellipse designated by a reference symbol "X" in FIG. 8, the detection of the strikes are judged normal or real. In such a period, the metal plates 17 and 18 are actually drilled by the blades 16*a* of the tapping screw 16, and no striking by the hammer occurs. However, if the tapping screw 16 is tilted in any way, the rotation speed of the motor 1 may be varied in one rotation of the output shaft 3, that is, the tapping screw 16 due to the existence of the blades 16*a*. Thus, the strike detector 11 erroneously detects the variation of the rotation speed of the motor 1 as the occurrence of the strikes by the hammer. Furthermore, there may be a case that the strike judger 14 using only the current information for the judgment of strike real or unreal cannot judge the erroneous detection of the strikes in the period of variation of the rotation speed of the motor 1 as errors.

Figure 9:
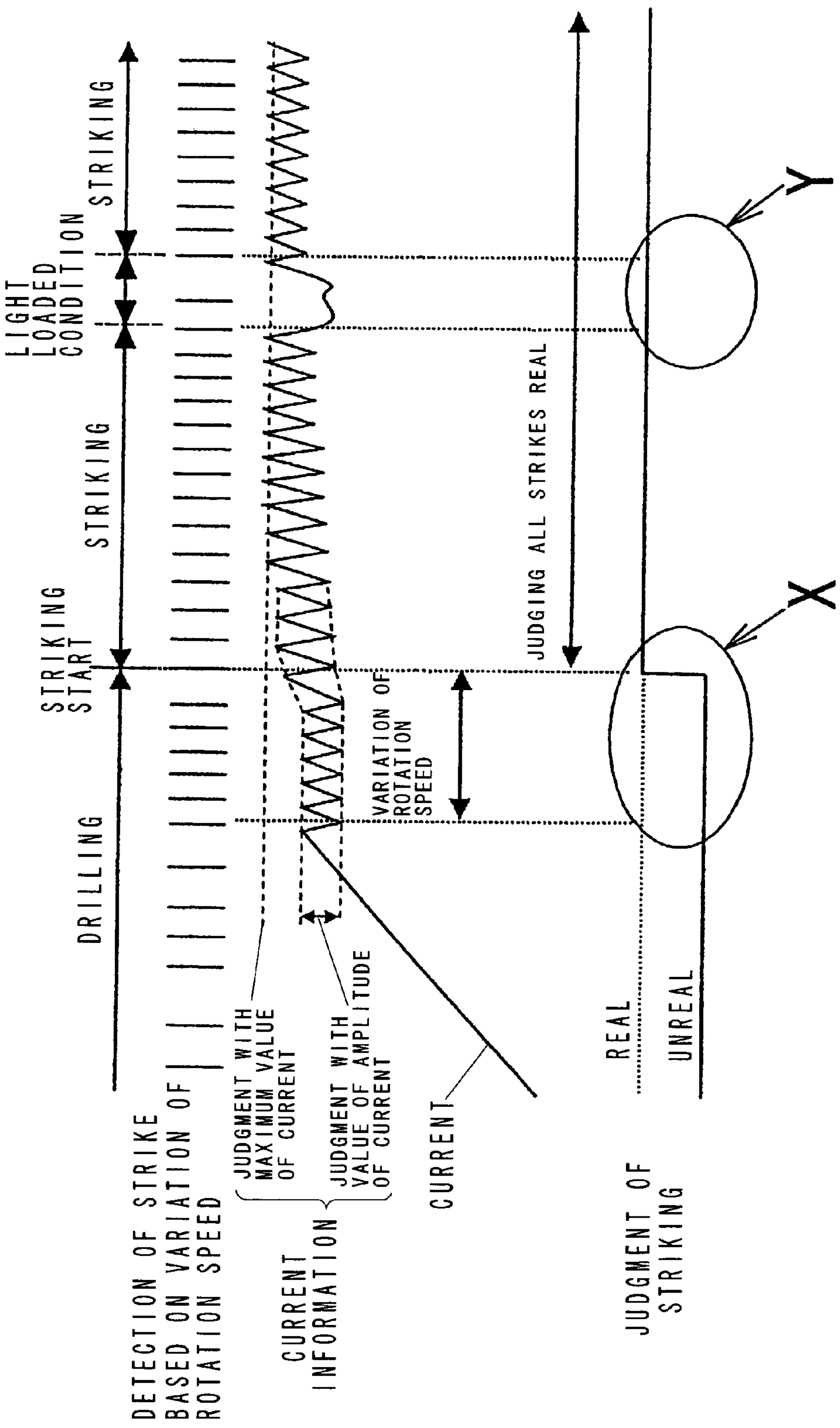
FIG. 9 is an explanatory drawing showing a method for judging real or unreal of occurrence of the strike suitable for the metal screw used in a metal fastening work operation by the above impact fastening tool.

In order to judge the detection of strike in this period as an error surely, when the rotation angle $\Delta r$ of the motor detected by rotation angle detector 9 in an interval of strikes detected by the strike detector 11 (that is, the above $\Delta R$ in the equation (3)) is equal to or larger than a predetermined threshold, the strike judger 14 is set to judge the detection of strike as an error regardless of the judgment with using the current information. FIG. 9 shows an example of the judgment of strike real or unreal in the above-mentioned fastening process of the tapping screw 16 by a modified method suitable for metal screw in this embodiment.

As for the threshold, a value corresponds to one rotation of the anvil or the output shaft 3 is set. Generally, the variation of the rotation speed of the motor 1 caused by the strikes of the hammer when the rotation of the output shaft 3 is restricted occurs a plurality of times (such as twice, thrice, and so on), while the motor 1 rotates a predetermined number of times corresponding to one rotation of the output shaft 3. In contrast, the variation of the rotation speed of the motor 1 caused by the blades 16*a* of the tapping screw 16 occurs only once while the motor 1 rotates the predetermined number of times. By setting the strike judger 14 as mentioned above, it is possible to ensure that the unreal detection of strike due to the drilling of the blades 16*a* of the tapping screws 16 which is inherent in the metal work is judged as an error, as shown in FIG. 9.

In an ellipse designated by a reference symbol "Y" in FIG. 8, the detection of strike detected by the strike detector 11 is judged erroneous or unreal by the strike judger 14 with using only the current information. In such a period, the drilling by the blades 16*a* of the tapping screw 16 has been completed, so that the load of the motor 1 is temporarily lightened before the head 16*c* contact with the metal plate 17. Under such a light loaded condition, the strike judger 14 may judge the detection of strike by the strike detector 11 as an error, even though the current information such as the maximum value of the current or the value of amplitude of the current is less than the threshold.

On the other hand, when the driving of the motor 1 is not surely stopped at a time when a predetermined number of strikes are applied to the head 16*c* of the tapping screw 16 after the head 16*c* contacts with the metal plate 17, the head 16*c* of the tapping screw 16 may be smashed by twisting. When the strike judger 14 judges the detection of strike detected by the strike detector 11 in the light loaded condition as an error, the strike judger 14 may recognize the detection of strike by the strike detector 11 after the head 16*c* contacts with the metal plate 17 as the strike in a new fastening work and ignore the fastening torque T calculated before the light loaded condition. In such a case, the tapping screw 16 may be smashed by twisting due to excess strikes.

Then, in the modified method for judgment of strike real or unreal suitable for metal screw, the strike judger 14 is set to judge all the detection of strike detected by the strike detector 11 as normal or real after judging the normal or real strikes by a predetermined number, continuously, as shown in FIG. 9. By such a configuration, it is possible to prevent the smash of the tapping screw 16 due to excess strikes by the hammer.

In the above mentioned embodiment, the impact driver is described as an example of the impact fastening tool, but the present invention is not limited to the description and illustration of the embodiment. The present invention can be applied to another impact fastening tool such as an impact wrench, or the like.

In summary, the impact fastening tool in accordance with the present invention comprises at least a motor 1 for generating a driving force, an output shaft 3 for fastening an object to be fastened, a strike mechanism 2 including a hammer and an anvil integrally rotated with the output shaft for generating impact force by striking the anvil by the hammer and transmitting the driving force to the output shaft 3 with the impact force, a strike detector 11 for detecting occurrence of strikes of the anvil by the hammer, a current detector 13 for detecting current information in an interval of the strikes, a strike judger 14 for judging whether detection of the strike by the strike detector 11 is real or unreal with using current information, a fastening torque calculator 12 for calculating a fastening torque equivalent to a fastening torque generated by the impact forces with ignoring the strike judged erroneous or unreal by the strike judger, and a motor controller 6 for stopping driving of the motor 1 at a time when the calculated fastening torque reaches to a predetermined reference value.

Since the detection of strike by the strike detector is judged real or unreal by the strike judger on the basis of essential phenomenon such as current information flowing in the motor instead of superficial phenomenon such as a rotation of the output shaft or an interval of the strikes, it is possible to prevent the erroneous detection of the strike against multiple variation of the load of the motor, surely, so that the fastening torque can be calculated precisely. Thus, the driving of the motor can be stopped when the number of the strikes reaches to the most suitable number corresponding to the most suitable number of the strikes.

The impact fastening tool may further comprise a rotation speed detector 10 for detecting a rotation speed ω of a shaft of the motor 1, and the strike judger 14 may judge the detection of the strike detected by the strike detector 11 by comparing the current information with a threshold which is changed corresponding to the rotation speed ω detected by the rotation speed detector 10. Since the threshold of the current information is changed corresponding to the rotation speed ω, it is possible to judge the detection of strike as real or unreal without influence of the rotation speed of the motor 1.

Furthermore, the strike judger may use a maximum value of the current detected by the current detector 13 as the current information, and may judge that a detection of strike detected by the strike detector 11 as an error when the maximum value of the current is equal to or smaller than a threshold. By such a configuration, the detection of strike can be judged precisely, especially when the rotation speed ω of the motor 1 is higher.

Still furthermore, the strike judger 14 may use a value of amplitude of the current detected by the current detector 13 as the current information, and judges that a detection of strike detected by the strike detector 11 as an error when the value of amplitude of the current is equal to or smaller than a threshold. By such a configuration, the detection of strike can be judged precisely, especially when the rotation speed ω of the motor 1 is lower.

Alternatively, the strike judger 14 may use at least one of a maximum value of the current and a mean value of the current detected by the current detector 13 as the current information, and selection of the maximum value of the current or the mean value of the current is automatically performed corresponding to the rotation speed detected by the rotation speed detector 10. By such a configuration, the detection of strike can be judged precisely in a broad region from low speed to high speed of the rotation speed ω of the motor 1.

The impact fastening tool may further comprise a rotation angle detector 9 for detecting a rotation angle of the shaft of the motor 1, and when the rotation angle detected by the rotation angle detector 9 in an interval of the strikes detected by the strike detector 11 is equal to or larger than a threshold, the strike judger 14 may judge that a detection of strike detected by the strike detector 11 as an error regardless of judgment with using the current information. In a metal work operation, for example, fastening metal plates by a tapping screw, the variation of the rotation speed ω of the motor 1 due to drilling by the tapping screw may be detected as the occurrence of the strike by the hammer in the judgment of the detection of strike with using only the current information. The strike judger 14, however, judge the detection of strike as an error when the rotation angle is equal to or larger than the threshold, so that it is possible to count the number of strikes precisely, thereby stopping the driving of the motor 1 at a time when a number of the strikes reaches to the most suitable number.

Furthermore, when the strike judger 14 continuously judges the detection of strike as real by a predetermined times, the strike judger 14 may judge subsequent all the detection of strike detected by the strike judger 11 as real. By such a configuration, it is possible to prevent the reset of counting the number of strikes even when the detection of strike is judged erroneous or unreal in the metal work operation. Thus, the driving of the motor 1 can be stopped when the number of the strikes reaches to the most suitable number without smashing a head of the screw.

This application is based on Japanese patent application 2005-48038 filed Feb. 23, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An impact fastening tool comprising:

a motor for generating a driving force;

an output shaft for fastening an object to be fastened;

a strike mechanism including a hammer and an anvil integrally rotated with the output shaft, generating impact force by striking the anvil by the hammer and transmitting the driving force generated by the motor to the output shaft with the impact force;

a rotation sensor that outputs a predetermined number of pulses by one rotation of a shaft of the motor;

a rotation speed detector that detects rotational speed of a shaft of the motor by measuring a pulse width of pulses outputted from the rotation sensor;

a strike detector that detects occurrence of strikes of the anvil by the hammer based on variation of the pulse width of the pulses measured by the rotation speed detector;

a current detector for detecting current information in an interval of the strikes;

a strike judger that judges whether detection of the strike by the strike detector is real or unreal by comparing current information detected by the current detector with a predetermined threshold;

a fastening torque calculator for calculating a fastening torque equivalent to a fastening torque generated by the impact forces by ignoring the strike judged unreal by the strike judger; and a motor controller for stopping driving of the motor at a time when the calculated fastening torque reaches a predetermined reference value.

2. The impact fastening tool in accordance with claim 1, wherein the threshold is changed corresponding to the rotation speed detected by the rotation speed detector.

3. The impact fastening tool in accordance with claim 1, wherein the strike judger uses a maximum value of the current detected by the current detector as the current information, and judges that a detection of strike detected by the strike detector as an error when the maximum value of the current is equal to or smaller than a threshold.

4. The impact fastening tool in accordance with claim 1, wherein the strike judger uses a value of amplitude of the current detected by the current detector as the current information, and judges that a detection of strike detected by the strike detector as an error when the value of amplitude of the current is equal to or smaller than a threshold.

5. The impact fastening tool in accordance with claim 2, wherein the strike judger uses a maximum value of the current detected by the current detector as the current information, and judges that a detection of strike detected by the strike detector as an error when the maximum value of the current is equal to or smaller than a threshold.

6. The impact fastening tool in accordance with claim 2, wherein the strike judger uses a value of amplitude of the current detected by the current detector as the current information, and judges that a detection of strike detected by the strike detector as an error when the value of amplitude of the current is equal to or smaller than a threshold.

7. The impact fastening tool in accordance with claim 1, wherein the strike judger uses at least one of a maximum value of the current and a mean value of the current detected by the current detector as the current information, and a selection of the maximum value of the current or the mean value of the current is automatically performed corresponding to the rotation speed detected by the rotation speed detector.

8. The impact fastening tool in accordance with claim 7, wherein the strike judger judges the detection of the strike detected by the strike detector by comparing the current information with a threshold which is changed corresponding to the rotation speed detected by the rotation speed detector.

9. The impact fastening tool in accordance with claim 7, wherein the strike judger judges that a detection of strike detected by the strike detector as an error when the maximum value of the current is equal to or smaller than a threshold.

10. The impact fastening tool in accordance with claim 7, wherein the strike judger judges that a detection of strike detected by the strike detector as an error when the value of amplitude of the current is equal to or smaller than a threshold.

11. The impact fastening tool in accordance with claim 1, wherein a rotation angle detector is further comprised for detecting a rotation angle of the shaft of the motor; and when the rotation angle detected by the rotation angle detector in an interval of the strikes detected by the strike detector is equal to or larger than a threshold, the strike judger judges that a detection of strike detected by the strike detector as an error regardless of judgment by using the current information.

12. The impact fastening tool in accordance with claim 11, wherein when the strike judger continuously judges the detection of strike as real a predetermined number of times, the strike judger subsequently judges all the detections of strike detected by the strike judger as real.

13. The impact fastening tool in accordance with claim 1, wherein when the strike judger continuously judges the detection of strike as real a predetermined number of times, the strike judger subsequently judges all the detections of strike detected by the strike judger as real.

14. The impact fastening tool in accordance with claim 13, wherein the threshold is changed corresponding to the rotation speed detected by the rotation speed detector.

15. The impact fastening tool in accordance with claim 13, wherein the strike judger uses a maximum value of the current detected by the current detector as the current information, and judges that a detection of strike detected by the strike detector as an error when the maximum value of the current is equal to or smaller than a threshold.

16. The impact fastening tool in accordance with claim 13, wherein the strike judger uses a value of amplitude of the current detected by the current detector as the current information, and judges that a detection of strike detected by the strike detector as an error when the value of amplitude of the current is equal or smaller than a threshold.

17. The impact fastening tool in accordance with claim 13, wherein the strike judger uses at least one of a maximum value of the current and a mean value of the current detected by the current detector as the current information, and selection of the maximum value of the current or the mean value of the current is automatically performed corresponding to the rotation speed detected by the rotation speed detector.

18. The impact fastening tool in accordance with claim 17, wherein the strike judger judges the detection of the strike detected by the strike detector by comparing the current information with a threshold which is changed corresponding to the rotation speed detected by the rotation speed detector.

19. The impact fastening tool in accordance with claim 17, wherein the strike judger judges that a detection of strike detected by the strike detector as an error when the maximum value of the current is equal to or smaller than a threshold.

20. The impact fastening tool in accordance with claim 17, wherein the strike judger judges that a detection of strike detected by the strike detector as an error when the value of amplitude of the current is equal to or smaller than a threshold.

* * * * *